T. A. EDISON.
COATING APPARATUS.
APPLICATION FILED OCT. 26, 1912.
1,197,723.
Patented Sept. 12, 1916.
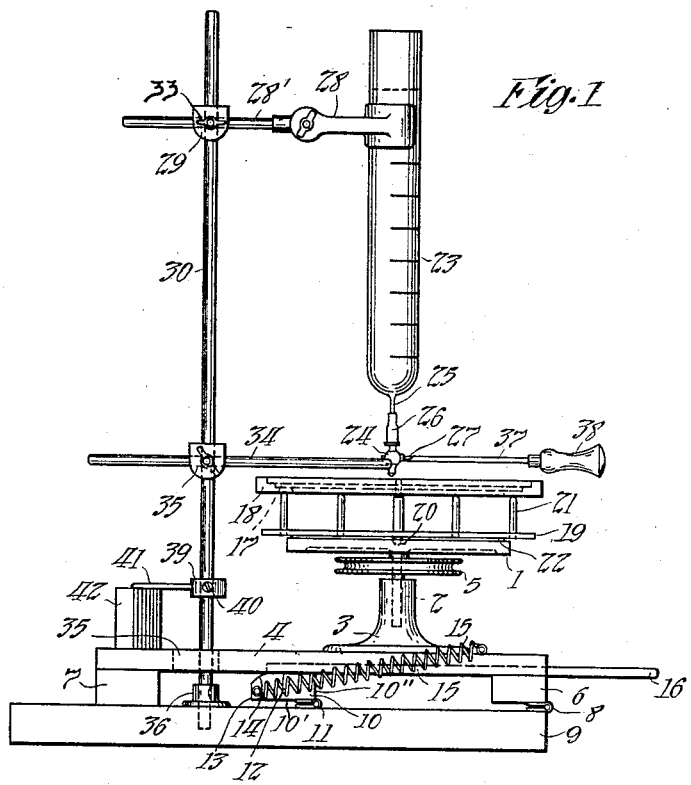
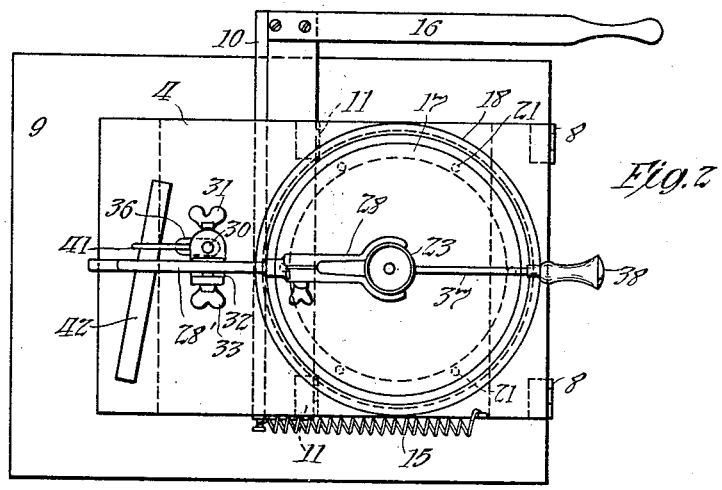
Witnesses:
C. E. Brown
Frederick Pachmann
Inventor:
Thomas A. Edison
by Frank L. Dyer
his Atty.

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

COATING APPARATUS.

1,197,723. Specification of Letters Patent. Patented Sept. 12, 1916.

Application filed October 26, 1912. Serial No. 727,828.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Coating Apparatus, of which the following is a description.

My invention relates to coating apparatus and is intended more particularly, but not exclusively, for use in connection with the process for forming molded articles which is set forth and claimed in an application of Jonas W. Aylsworth, Serial No. 674,289, filed January 30, 1912. According to this process, a base or backing is provided with a surface covering or veneer of suitable moldable material, the process involving the formation of the surface veneer upon the smooth polished surface of a metallic plate or other blank mold and the subsequent transfer of the same under heat and pressure to the surface of the object to be coated with the firm adhesion or welding of the surface veneer to the object. In the formation of the surface veneer on the mold or transfer plate prior to the welding of the veneer to the base or backing, the surfacing material or "stock" in solution or fluid form is coated to a suitable thickness upon the molds or transfer plates and then dried and hardened.

My invention relates particularly to apparatus whereby the said surfacing material may be conveniently and homogeneously applied to or coated upon the surface of the mold or transfer plate.

The object of my invention is to provide an improved device of this character.

My invention is capable of embodiment in various forms, one of these forms being disclosed and claimed in this application and another in a co-pending application, Serial No. 727,829, filed on even date herewith, the broad features of my invention being claimed in this application.

In order that my invention may be more clearly understood, attention is hereby directed to the accompanying drawing forming a part of this specification and in which—

Figure 1 represents a side elevation of one embodiment of my invention; and Fig. 2 represents a plan view thereof.

In both the views like parts are designated by the same reference characters.

In the drawing, the numeral 1 designates a turntable or support provided with a downwardly extending shaft 2 whereby the same is rotatably mounted in a socket 3 secured to a frame member 4. A pulley 5 is secured to the shaft 2 and is adapted to be driven by a belt (not shown) connected to a suitable source of power (not shown) to rotate the turntable 1. Cleats 6 and 7 extend under and are secured to opposite edge portions of the member 4, the cleat 6 being hinged as shown at 8 to a base 9, the cleat 7 being adapted to rest upon the base 9 and to coact with the cleat 6 to hold the member 4 spaced above the said base. By reason of the hinged mounting of the member 4, the latter and the turntable 1 carried thereby may be readily positioned either in a horizontal or in an inclined position. In order to facilitate the positioning of the member 4, I provide a cam-like member 10 hinged to the base 9, as shown at 11, so as to be capable of movement about an axis substantially parallel to the axis of the hinges 8. The axis of the hinges 11 is located at the intersection of two relatively inclined surfaces 10' and 10'' of the member 10; so that the said member may be supported either in the position shown in Fig. 1 or in a position at an angle thereto, in which latter position the surface 10'' of the member 10 will rest upon the upper surface of the base 9. The member 10 has a surface portion 12 adapted to engage the lower surface of the member 4 when the last named member is in its lower position, as shown, and a surface portion 13 situated at a greater distance from the axis of the hinges 11 and adapted to support the member 4 in elevated position. A curved cam-like surface 14 connects the surface portions 12 and 13 and facilitates the camming of the member 4 to an inclined position when the member 10 is rotated from the position shown in Fig. 1 in a clockwise direction. A spring 15 connected with the members 4 and 10 serves to hold the member 10 in an elevated position with the member 4 and the support or turntable 1 supported in an inclined position. To facilitate the oscillation of the member 10 about the hinges 11, I preferably extend the said member laterally beyond the base 9 as shown in Fig. 2 and secure to the same a manually operable arm 16. When the member 10 is oscillated in an anti-clockwise direction toward the position shown in Fig. 1, the weight of the frame member 4 and the parts carried thereby is sufficient to cause the said member and parts to assume and retain their normal positions, as shown in the said figure.

The mold or transfer plate to be coated is shown at 17, the said mold or plate, as shown, being provided with a detachable supporting ring 18 and being otherwise constructed as more fully described and claimed in my co-pending application, Serial No. 727,829, filed on even date herewith. In order to facilitate the handling of the transfer plate, I preferably provide a supporting frame therefor comprising a base member 19 having a centrally disposed downwardly projecting stud 20 adapted to be inserted in a central aperture in the turntable or support 1 and having adjacent its periphery a plurality of vertically extending rods or fingers 21 upon the upper ends of which the mold or transfer plate is adapted to rest. A ring or covering 22 of rubber or similar material is secured to the upper face of the turntable or support 1, the base 19 of the mold supporting frame resting frictionally in engagement with the said ring or covering. It will be evident that the frame 19, 21 and the mold or transfer plate will be carried along with the turntable or support 1 during the rotation of the latter.

The surfacing material or "stock" is preferably carried in a graduated glass burette or similar receptacle or reservoir 23 provided with an outlet nozzle 24, the latter being connected to the neck 25 on the burette, as by a rubber or other flexible connection 26. A valve 27 in the outlet nozzle 24 controls the flow of the surface material through the said nozzle. The burette 23 is supported near its upper end between the jaws of an adjustable clamp 28 secured to a horizontally extending rod 28', which latter is secured, as by a connection 29 to the vertically extending rod 30. The said rod extends through a vertical opening in the connection 29, as shown in Fig. 2, a set screw 31 serving to clamp the connection in adjusted position on the said rod. The arm 28' extends through a horizontal passage 32 in the connection 29, a set screw 33 serving to secure the same in adjusted position in the said passage. The rod 28', the clamp 28, and the burette 23 may, therefore, be secured by the connection 29 in various positions of vertical or horizontal adjustment with respect to the rod 30. A second horizontally extending rod 34 is secured, as by soldering, to one side of the nozzle 24 and is adjustably secured to the rod 30 by means of a connection 35 similar to the connection 29. The rod 30 extends through a slot 35 in the member 4 and through a collar 36 secured to the top of the base 9, and is supported on the base 9 for axial rotation within the sleeve 36. By means of the pivotal mounting of the rod 30, the fluid receptacle or burette 23 and the nozzle 24 connected therewith may be readily moved across the top of the mold or transfer plate or entirely to one side of the same. For facilitating the lateral oscillation of the burette as well as the opening and closing of the valve 27, I provide a rod 37 secured, as by soldering, to the valve 27, the rod 37 being preferably provided with a handle 38. The slot 35 extends to the side of the rod 30 in a direction at right angles to the axis of the hinges 8 in order to permit the member 4 to be tilted without hindrance from the said rod. In order to prevent tilting of the member 4 and the parts carried thereby, while the fluid feeding parts are above the transfer plate or mold, I provide a collar 39 secured to the rod 30, as by a set screw 40, and having an arm or extension 41 located in contact with the upper surface of a block or projection 42 on the member 4 when the outlet nozzle 24 is above the mold or transfer plate, but located beyond the range of the same when the said outlet nozzle is swung to one side of the mold or transfer plate.

In the operation of my device, I place the mold or transfer plate upon the fingers 21 as shown, and with the support 1 and the mold or transfer plate in a horizontal position, I rotate the same and feed the surfacing material or "stock" by movement of handle 38 from the center of the mold a short distance outwardly. The support 1 may be rotated either manually or by means of the pulley 5. While the whole mold or transfer plate might be coated in this manner, I prefer in some instances to coat only the central portion of the same in this manner and then to swing the fluid feeding means to one side of the said mold or plate and to tilt the latter by means of the arm 16. The surfacing material or "stock" will now flow downwardly toward the lower edge portion of the plate or mold; and if the latter be slowly rotated, the said material can be caused to cover the whole of the mold surface uniformly. The graduations on the burette are so arranged that the space between two consecutive graduation marks indicates the amount of surfacing material to be used in coating each mold or transfer plate.

Many modifications may be made in the invention as herein disclosed and I do not limit myself to the specific details shown and described.

What I claim as new and desire to protect by Letters Patent is as follows:

1. In apparatus of the class described, the combination of a table rotatable about a substantially vertical axis, stock feeding means having an outlet in proximity to said table, and means for supporting said table in an inclined position, substantially as described.

2. In apparatus of the class described, the combination of a rotatable support, and stock feeding means having an outlet in proximity to said support and means for controlling the flow of stock from said outlet, said stock feeding means comprising a reservoir mounted for pivotal movement across said support in a direction substantially at right angles to the axis of rotation of said support, substantially as described.

3. In apparatus of the class described, the combination of a support rotatable about a substantially vertical axis, and stock feeding means having an outlet in proximity to said support and means for controlling the flow of stock from said outlet, said support being movable to support an article resting thereon in either a horizontal or an inclined position, substantially as described.

4. In apparatus of the class described, the combination of a support rotatable about a substantially vertical axis, stock feeding means having an outlet in proximity to said support and means for controlling the flow of stock from said outlet, and means for tilting said support into an inclined position, substantially as described.

5. In apparatus of the class described, the combination of a support rotatable about a substantially vertical axis, stock feeding means having an outlet in proximity to said support and means for controlling the flow of stock from said outlet, means for moving said support to an inclined position, and means tending to hold the same in said position, substantially as described.

6. In apparatus of the class described, the combination of a support rotatable about a substantially vertical axis, stock feeding means having an outlet in proximity to said support and means for controlling the flow of stock from said outlet, means for moving said support to an inclined position, and resilient means tending to hold the same in said position, substantially as described.

7. In apparatus of the class described, the combination of a support, stock feeding means having an outlet located in proximity to said support and movable across the same and means for controlling the flow of stock from said outlet, means for moving said support to an inclined position, and means tending to hold the same in said position, substantially as described.

8. In apparatus of the class described, the combination of a support, stock feeding means movable relatively to said support to a position either above said support or to one side of the same, means for tilting said support, and means for preventing the tilting of the same when said stock feeding means is above said support, substantially as described.

9. In apparatus of the class described, the combination of a rotatable support, stock feeding means movable relatively to said support to a position either above said support or to one side of the same, means for tilting said support, and means for preventing the tilting of the same when said stock feeding means is above said support, substantially as described.

10. In apparatus of the class described, the combination of a rotatable support and stock feeding means having an outlet in proximity to said support, said stock feeding means being movable relatively to said support for distributing stock to different portions of the surface of an article carried by said support, and means for tilting said support, substantially as described.

11. In apparatus of the class described, the combination of a support and stock feeding means having an outlet in proximity to said support, said stock feeding means being movable relatively to said support for distributing stock to different portions of the surface of an article carried by said support, and means for tilting said support, substantially as described.

12. In apparatus of the class described, the combination of a rotatable support, a mounting therefor movable about a substantially horizontal axis, means for moving said mounting and support about said axis to an inclined position, and means tending to hold the same in said position, substantially as described.

13. In apparatus of the class described, the combination of a rotatable support, a mounting therefor movable about a substantially horizontal axis, means for moving said mounting and support about said axis to an inclined position, means for holding the same in an inclined position and means for holding the same against movement by said moving means, substantially as described.

14. In apparatus of the class described, the combination of a rotatable support having upwardly extending supporting fingers, fluid feeding means having an outlet in proximity to said support, said support and fluid feeding means being relatively movable for distributing the fluid from said feeding means to different portions of the surface of an article carried by said support, and means for tilting said support into an inclined position, substantially as described.

This specification signed and witnessed this 25th day of October 1912.

THOS. A. EDISON.

Witnesses:
FREDERICK BACHMANN,
MARY J. LAIDLAW.

Copies of this patent may be obtained for five cents each, by addressing the "Commissioner of Patents, Washington, D. C."

Correction in Letters Patent No. 1,197,723.

It is hereby certified that in Letters Patent No. 1,197,723, granted September 12, 1916, upon the application of Thomas A. Edison, of Llewellyn Park, West Orange, New Jersey, for an improvement in "Coating Apparatus," an error appears in the printed specification requiring correction as follows: Page 2, line 21, for the number "727,829" read *727,830;* and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents*

Cl. 91—43.